US012595765B2

(12) United States Patent
Clark et al.

(10) Patent No.:    US 12,595,765 B2
(45) Date of Patent:        Apr. 7, 2026

(54) BIFURCATION INTEGRATED ELECTRICAL SYSTEM FOR HYBRID AIRCRAFT PROPULSION SYSTEM

(71) Applicant: RTX Corporation, Farmington, CT (US)

(72) Inventors: Thomas E. Clark, Wells, ME (US); Murat Yazici, Glastonbury, CT (US); Jeffrey T. Morton, Manchester, CT (US)

(73) Assignee: RTX Corporation, Farmington, CT (US)

( * ) Notice:    Subject to any disclaimer, the term of this patent is extended or adjusted under 35 U.S.C. 154(b) by 21 days.

(21) Appl. No.: 18/431,620

(22) Filed:    Feb. 2, 2024

(65)            Prior Publication Data

US 2025/0250940 A1      Aug. 7, 2025

(51) Int. Cl.
| | |
|---|---|
| *F02C 7/32* | (2006.01) |
| *B64D 27/10* | (2006.01) |
| *B64D 47/00* | (2006.01) |
| *F02C 3/00* | (2006.01) |
| *F02C 7/266* | (2006.01) |

(52) U.S. Cl.
CPC ................. *F02C 7/32* (2013.01); *B64D 27/10* (2013.01); *B64D 47/00* (2013.01); *F02C 3/00* (2013.01); *F02C 7/266* (2013.01); *F05D 2220/76* (2013.01)

(58) Field of Classification Search
None
See application file for complete search history.

(56)            References Cited

U.S. PATENT DOCUMENTS

| | | | |
|---|---|---|---|
| 9,297,307 B2 | 3/2016 | Lior | |
| 9,713,202 B2 * | 7/2017 | Broughton | ............. H01R 12/00 |
| 9,934,885 B2 | 4/2018 | Broughton | |
| 11,421,590 B2 * | 8/2022 | Kupratis | .................. F02C 3/14 |
| 11,566,567 B2 | 1/2023 | Kupratis | |
| 2016/0187425 A1 * | 6/2016 | Fahringer | ........... H02P 29/0241 |
| | | | 322/99 |
| 2019/0085715 A1 * | 3/2019 | van Dder Merwe | ..... F02C 7/32 |
| 2019/0176993 A1 * | 6/2019 | Skoglund | ............... B64D 15/12 |

(Continued)

OTHER PUBLICATIONS

EP Search Report for EP Patent Application No. 25155407.7 dated Jun. 11, 2025.

*Primary Examiner* — Gerald L Sung
*Assistant Examiner* — Jacek Lisowski
(74) *Attorney, Agent, or Firm* — Getz Balich LLC

(57)            ABSTRACT

A system for an aircraft includes a fan rotor, an engine core, a fan case, a core case, a bifurcation, an inner electrical system, an outer electrical system and multiple electrical lines electrically coupling the inner electrical system to the outer electrical system. The engine core is configured to drive rotation of the fan rotor about an axis. The fan case houses the fan rotor. The core case houses the engine core. The bifurcation radially crosses a bypass flowpath. The bypass flowpath is downstream of the fan rotor and located radially between the fan case and the core case. The inner electrical system is arranged with the engine core. The outer electrical system is mounted to the fan case. The electrical lines extend between and electrically couple the inner electrical system to the outer electrical system. The electrical lines run in parallel along one another radially through the bifurcation.

16 Claims, 7 Drawing Sheets

(56)  References Cited

U.S. PATENT DOCUMENTS

| | | | |
|---|---|---|---|
| 2020/0157966 A1 | 5/2020 | Huang | |
| 2021/0324799 A1* | 10/2021 | Suzuki | B64D 33/08 |
| 2022/0009643 A1* | 1/2022 | Datta | F02C 6/00 |
| 2022/0063819 A1* | 3/2022 | Murrow | B64D 31/18 |
| 2022/0082052 A1* | 3/2022 | Muldoon | F02K 1/04 |
| 2024/0002062 A1 | 1/2024 | Trainer | |

* cited by examiner

BIFURCATION INTEGRATED ELECTRICAL SYSTEM FOR HYBRID AIRCRAFT PROPULSION SYSTEM

BACKGROUND OF THE DISCLOSURE

1. Technical Field

This disclosure relates generally to an aircraft propulsion system and, more particularly, to an electrical system for the aircraft propulsion system.

2. Background Information

An aircraft propulsion system includes an electrical system to facilitate operation of the aircraft propulsion system. Various types and configurations of electrical systems are known in the art. While these known electrical systems have various benefits, there is still room in the art for improvement.

SUMMARY OF THE DISCLOSURE

According to an aspect of the present disclosure, a system is provided for an aircraft. This system includes a fan rotor, an engine core, a fan case, a core case, a bifurcation, an inner electrical system, an outer electrical system and a plurality of electrical lines extending between and electrically coupling the inner electrical system to the outer electrical system. The engine core is configured to drive rotation of the fan rotor about an axis. The fan case houses the fan rotor. The core case houses the engine core. The bifurcation radially crosses a bypass flowpath. The bypass flowpath is downstream of the fan rotor and located radially between the fan case and the core case. The inner electrical system is arranged with the engine core. The outer electrical system is mounted to the fan case. The electrical lines extend between and electrically couple the inner electrical system to the outer electrical system. The electrical lines run in parallel along one another radially through the bifurcation. A first set of the electrical lines extends in a first direction circumferentially along the fan case away from the bifurcation. Each electrical line in the first set of the electrical lines is configured for an operating power greater than twenty kilowatts. A second set of the plurality of electrical lines extends in a second direction circumferentially along the fan case away from the bifurcation. Each electrical line in the second set of the electrical lines is configured for an operating power less than twenty kilowatts.

According to another aspect of the present disclosure, another system is provided for an aircraft. This system includes a fan rotor, an engine core, a fan case, a core case, a bifurcation, a first inner electrical component, a second inner electrical component, a first outer electrical component, a second outer electrical component, a first line and a second line. The engine core is configured to drive rotation of the fan rotor about an axis. The fan case houses the fan rotor. The core case houses the engine core. The bifurcation extends radially across a bypass flowpath. The bypass flowpath is downstream of the fan rotor and radially between the core case and the fan case. The first inner electrical component is arranged with the engine core and has a first operating power greater than twenty kilowatts. The second inner electrical component is arranged with the engine core and has a second operating power less than twenty kilowatts. The first outer electrical component is mounted to the fan case. The second outer electrical component is mounted to the fan case. The first line electrically couples the first inner electrical component to the first outer electrical component. The second line electrically couples the first inner electrical component to the first outer electrical component. The first line and the second line run in parallel through the bifurcation. The first line runs in a first circumferential direction along the fan case away from the bifurcation to the first outer electrical component. The second line runs in a second circumferential direction along the fan case away from the bifurcation to the second outer electrical component.

According to still another aspect of the present disclosure, another system is provided for an aircraft. This system includes a fan rotor, an engine core, a fan case, a core case, a lower bifurcation, a plurality of electric machines, a plurality of control units, an electrical bus, a plurality of electrical lines and an engine controller. The engine core is configured to drive rotation of the fan rotor about an axis. The fan case houses the fan rotor. The core case houses the engine core. The lower bifurcation radially crosses a bypass flowpath. The bypass flowpath is downstream of the fan rotor and is located radially between the fan case and the core case. The electric machines are operatively coupled to the engine core and radially next to the core case. The control units are mounted to the fan case at a first lateral side of the fan case. The electrical bus is mounted to the fan case vertically above the control units and at the first lateral side of the fan case. The electrical bus is electrically coupled to each of the control units. The electrical lines extend between and electrically couple the electric machines to the control units. The electrical lines extend radially through the lower bifurcation and axially from the lower bifurcation to the fan case. The engine controller is mounted to the fan case at a second lateral side of the fan case opposite the first lateral side of the fan case.

The operating power for each electrical line in the first set of the electrical lines may be greater than thirty or forty kilowatts.

The operating power for each electrical line in the second set of the electrical lines may be less than ten or fifteen kilowatts.

Each electrical line in the first set of the electrical lines may be configured for an operating current greater than one hundred amps.

Each electrical line in the second set of the plurality of electrical lines may be configured for an operating current less than fifty amps.

The electrical lines may run in parallel axially from the bifurcation to the fan case.

The electrical lines may run in parallel axially along an aft section of the fan case.

The inner electrical system may include a first electric machine. The outer electrical system may include a first control unit. The first set of the electrical lines may include a first electrical line extending between and electrically coupling the first electric machine and the first control unit.

The engine core may include a rotating assembly with a turbine rotor. The first electric machine may be operatively coupled to the rotating assembly.

The first electric machine may be configured as or otherwise include an electric motor.

The first electric machine may be configured as or otherwise include an electric generator.

The first electric machine may be configured as or otherwise include a motor-generator.

The inner electrical system may also include a second electric machine. The outer electrical system may also include a second control unit. The first set of the electrical lines may include a second electrical line extending between and electrically coupling the second electric machine and the second control unit.

The engine core may include a rotating assembly with a turbine rotor. The first electric machine and the second electric machine may each be operatively coupled to the rotating assembly.

The engine core may include a first rotating assembly and a second rotating assembly. The first rotating assembly may include a first turbine rotor. The second rotating assembly may include a second turbine rotor. The first electric machine may be operatively coupled to the first rotating assembly. The second electric machine may be operatively coupled to the second rotating assembly.

The second set of the electrical lines may include a first electrical line. The inner electrical system may include an electrical component electrically coupled to the first electrical line. The electrical component may include one of a sensor, an actuator or an ignitor.

The second set of the electrical lines may include a first electrical line. The outer electrical system may include an electrical component electrically coupled to the first electrical line. The electrical component may include one of a controller or an exciter.

The bifurcation may be a lower bifurcation disposed at a vertical bottom side of the core case.

The system may also include a non-conductive barrier separating the first set of the electrical lines from the second set of the electrical lines as the electrical lines run in parallel along one another.

The system may also include one or more fluid lines run in parallel along the electrical lines radially through the bifurcation with the second set of the electrical lines laterally between the first set of the electrical lines and the fluid lines.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
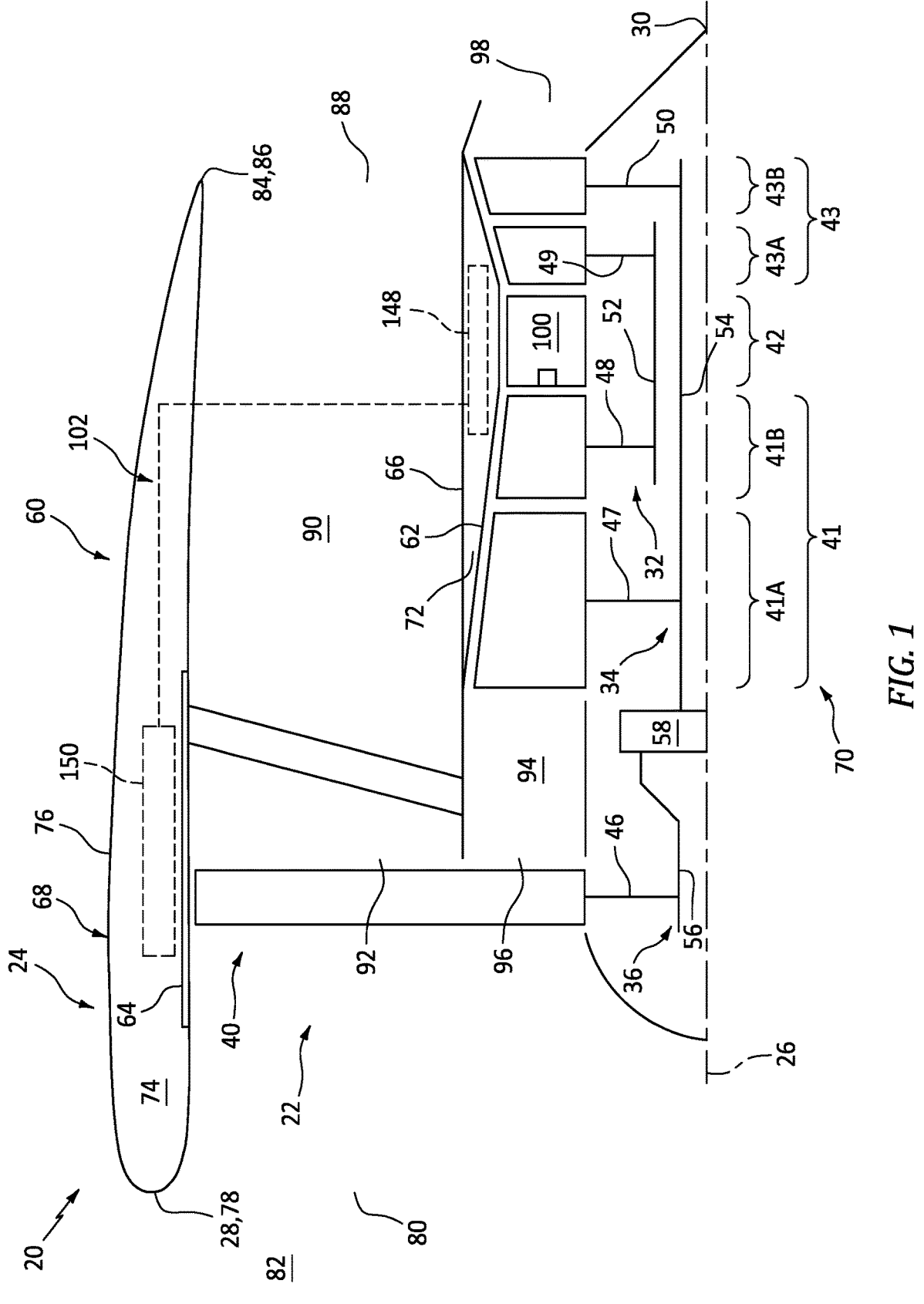
FIG. 1 is a partial side schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. The aircraft propulsion system 20 includes a turbine engine 22 and a nacelle 24 housing and forming an aerodynamic cover over the turbine engine 22. The aircraft propulsion system 20 extends axially along an axis 26 from an upstream, forward end 28 of the aircraft propulsion system 20 to a downstream, aft end 30 of the aircraft propulsion system 20. The axis 26 may be a centerline axis of the aircraft propulsion system 20 and/or one or more of its members 22 and/or 24. The axis 26 may also or alternatively be a rotational axis of one or more rotating components and/or assemblies (e.g., rotating assemblies 32, 34 and/or 36) of the turbine engine 22.

The turbine engine 22 may be configured as a turbofan engine. The turbine engine 22 of FIG. 1, for example, includes a fan section 40, a compressor section 41, a combustor section 42 and a turbine section 43. The compressor section 41 of FIG. 1 includes a low pressure compressor (LPC) section 41A and a high pressure compressor (HPC) section 41B. The turbine section 43 of FIG. 1 includes a high pressure turbine (HPT) section 43A and a low pressure turbine (LPT) section 43B.

Each of the engine sections 40, 41A, 41B, 43A and 43B includes a respective bladed rotor 46-50. Each of these bladed rotors 46-50 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The HPC rotor 48 is coupled to and rotatable with the HPT rotor 49. The HPC rotor 48 of FIG. 1, for example, is connected to the HPT rotor 49 through a high speed shaft 52. At least (or only) the HPC rotor 48, the HPT rotor 49 and the high speed shaft 52 collectively form the high speed rotating assembly 32; e.g., a high speed spool of the turbine engine 22.

The LPC rotor 47 is coupled to and rotatable with the LPT rotor 50. The LPC rotor 47 of FIG. 1, for example, is connected to the LPT rotor 50 through a low speed shaft 54. At least (or only) the LPC rotor 47, the LPT rotor 50 and the low speed shaft 54 collectively form the low speed rotating assembly 34; e.g., a low speed spool of the turbine engine 22.

The fan rotor 46 of FIG. 1 is connected to a fan shaft 56. At least (or only) the fan rotor 46 and the fan shaft 56 collectively form the fan rotating assembly 36. This fan rotating assembly 36 of FIG. 1 is coupled to the low speed rotating assembly 34 through a geartrain 58 (e.g., an epicyclic gear system, a transmission, etc.) such that the low speed rotating assembly 34 and its LPT rotor 50 may rotate at a different rotational velocity than the fan rotating assembly 36 and its fan rotor 46. However, it is contemplated the fan rotor 46 may alternatively be coupled to the low speed rotating assembly 34 and its LPT rotor 50 without the geartrain 58 such that the LPT rotor 50 is configured to directly drive rotation of the fan rotor 46 through a shaft (e.g., the low speed shaft 54) or a shaft assembly.

The engine sections 40, 41A, 41B, 42, 43A and 43B may be arranged sequentially along the axis 26 and are housed within a stationary housing 60 of the aircraft propulsion system 20. This propulsion system housing 60 includes an inner core case 62 and an outer fan case 64. The propulsion system housing 60 of FIG. 1 also includes an inner structure 66 of the nacelle 24 (e.g., a fixed inner structure) and an outer structure 68 of the nacelle 24.

The core case 62 houses one or more of the engine sections 41A-43B; e.g., a core 70 of the turbine engine 22. The core case 62 of FIG. 1, for example, is disposed radially outboard of, extends axially along (e.g., axially overlaps) and extends circumferentially about (e.g., circumscribes) the engine sections 41A-43B and their respective bladed rotors 47-50. The core case 62 may also house the core rotating assemblies 32, 34 and the geartrain 58.

The fan case 64 houses the fan section 40. The fan case 64 of FIG. 1, for example, is disposed radially outboard of, extends axially along (e.g., axially overlaps) and extends circumferentially about (e.g., circumscribes) the fan section 40 and its fan rotor 46.

The nacelle inner structure 66 houses and provides an aerodynamic cover over the core case 62. The nacelle inner structure 66 of FIG. 1, for example, is disposed radially outboard of, extends axially along (e.g., axially overlaps) and extends circumferentially about (e.g., circumscribes) the engine core 70 and its core case 62. An inner compartment 72 (e.g., an annular cavity or another volume) may be formed by and radially between the nacelle inner structure 66 and the core case 62.

The nacelle outer structure 68 houses and provides an aerodynamic cover over the fan case 64. The nacelle outer structure 68 of FIG. 1, for example, is disposed radially outboard of, extends axially along (e.g., axially overlaps) and extends circumferentially about (e.g., circumscribes) the fan section 40 and its fan case 64. An outer compartment 74 (e.g., an annular cavity or another volume) may be formed by and radially between an outer wall 76 of the nacelle outer structure 68 and the fan case 64. The nacelle outer structure 68 projects axially forward from the fan case 64, along the axis 26, to a leading edge 78 of the nacelle outer structure 68 (and more generally the aircraft propulsion system 20) at the propulsion system forward end 28. At this leading edge 78, the nacelle outer structure 68 forms an airflow inlet 80 from an environment 82 external to the aircraft propulsion system 20 into the aircraft propulsion system 20. The nacelle outer structure 68 also projects axially aft from the fan case 64, along the axis 26 and at least a forward portion of the nacelle inner structure 66, to a trailing edge 84 of the nacelle outer structure 68 at a downstream, aft end 86 of the nacelle outer structure 68. At this trailing edge 84, the nacelle outer structure 68 and the nacelle inner structure 66 collectively form an exhaust 88 from a (e.g., annular) bypass flowpath 90 into the external environment 82.

The bypass flowpath 90 extends axially in the aircraft propulsion system 20 and its turbine engine 22 from an airflow inlet 92 into the bypass flowpath 90 to its bypass exhaust 88. Here, the bypass inlet 92 is axially next to (e.g., adjacent) and downstream of the fan section 40 and its fan rotor 46. The bypass inlet 92 thereby fluidly couples the bypass flowpath 90 to the fan section 40. The bypass flowpath 90 is disposed radially outboard of and extends axially along the engine core 70 and the nacelle inner structure 66. The bypass flowpath 90 thereby bypasses (e.g., does not extend in) the engine core 70.

A (e.g., annular) core flowpath 94 extends within the engine core 70 between an airflow inlet 96 into the core flowpath 94 and a combustion products exhaust 98 from the core flowpath 94 to the external environment 82. The core flowpath 94 of FIG. 1, for example, extends sequentially through the LPC section 41A, the HPC section 41B, the combustor section 42, the HPT section 43A and the LPT section 43B from the core inlet 96 to the core exhaust 98. Here, the core inlet 96 is axially next to and downstream of the fan section 40 and its fan rotor 46. The core inlet 96 thereby fluidly couples the core flowpath 94 to the fan section 40. The core inlet 96 of FIG. 1 is also radially inboard of and may (or may not) be axially aligned with the bypass inlet 92.

During operation, air enters the aircraft propulsion system 20 through the airflow inlet 80. This air is directed through the fan section 40 and into the core flowpath 94 and the bypass flowpath 90. The air entering the core flowpath 94 may be referred to as "core air". The air entering the bypass flowpath 90 may be referred to as "bypass air".

The core air is compressed by the LPC rotor 47 and the HPC rotor 48 and directed into a (e.g., annular) combustion chamber 100 of a (e.g., annular) combustor in the combustor section 42. Fuel is injected into the combustion chamber 100 and mixed with the compressed core air to provide a fuel-air mixture. This fuel-air mixture is ignited and combustion products thereof flow through and sequentially drive rotation of the HPT rotor 49 and the LPT rotor 50. The rotation of the HPT rotor 49 and the LPT rotor 50 respectively drive rotation of the HPC rotor 48 and the LPC rotor 47 and, thus, compression of the air received from the core inlet 96. The rotation of the LPT rotor 50 also drives rotation of the fan rotor 46. The rotation of the fan rotor 46 propels the bypass air through the bypass flowpath 90 and out of the aircraft propulsion system 20 through the bypass exhaust 88. The propulsion of the bypass air may account for a majority of thrust generated by the aircraft propulsion system 20 and its turbine engine 22, e.g., more than seventy-five percent (75%) of thrust. The aircraft propulsion system 20 of the present disclosure, however, is not limited to the foregoing exemplary thrust ratio.

Figure 2:
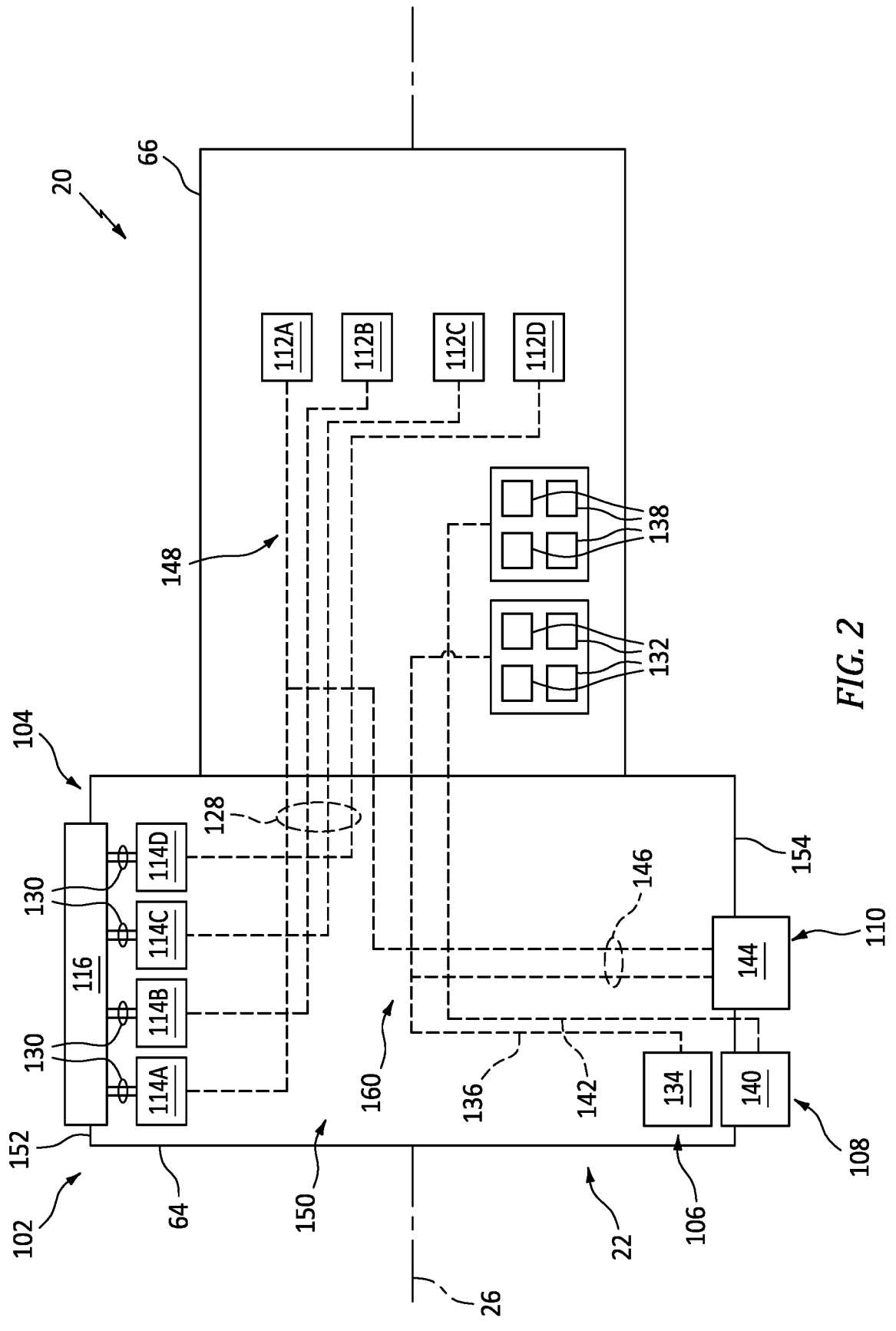
FIG. 2 is a partial bottom schematic illustration of the aircraft propulsion system with its electrical system.

FIG. 2 partially illustrates an electrical system 102 for the turbine engine 22. This electrical system 102 includes at least one high power system 104 and one or more low power systems 106, 108 and 110. The term "high power" may describe a system and/or components which operate with an operating power of greater than twenty kilowatts (20 kW); e.g., between (a) twenty kilowatts (20 kW), thirty kilowatts (30 kW) or forty kilowatts (40 kW) and (b) two thousand kilowatts (2000 kW). The term "low power" may describe a system and/or components which operate with an operating power of less than twenty kilowatts (20 kW); e.g., equal to or less than twenty kilowatts (20 kW), fifteen kilowatts (15 kW) or ten kilowatts (10 kW), to as low as 0.01 kilowatts. Typically, the high power system 104 and its components described below are configured to operate with a relatively high amperage (e.g., a peak amperage greater than one hundred amps). Each low power systems 106, 108, 110 and its components described below are configured to operate with a relatively low amperage (e.g., a peak amperage less than one hundred amps).

Figure 3:
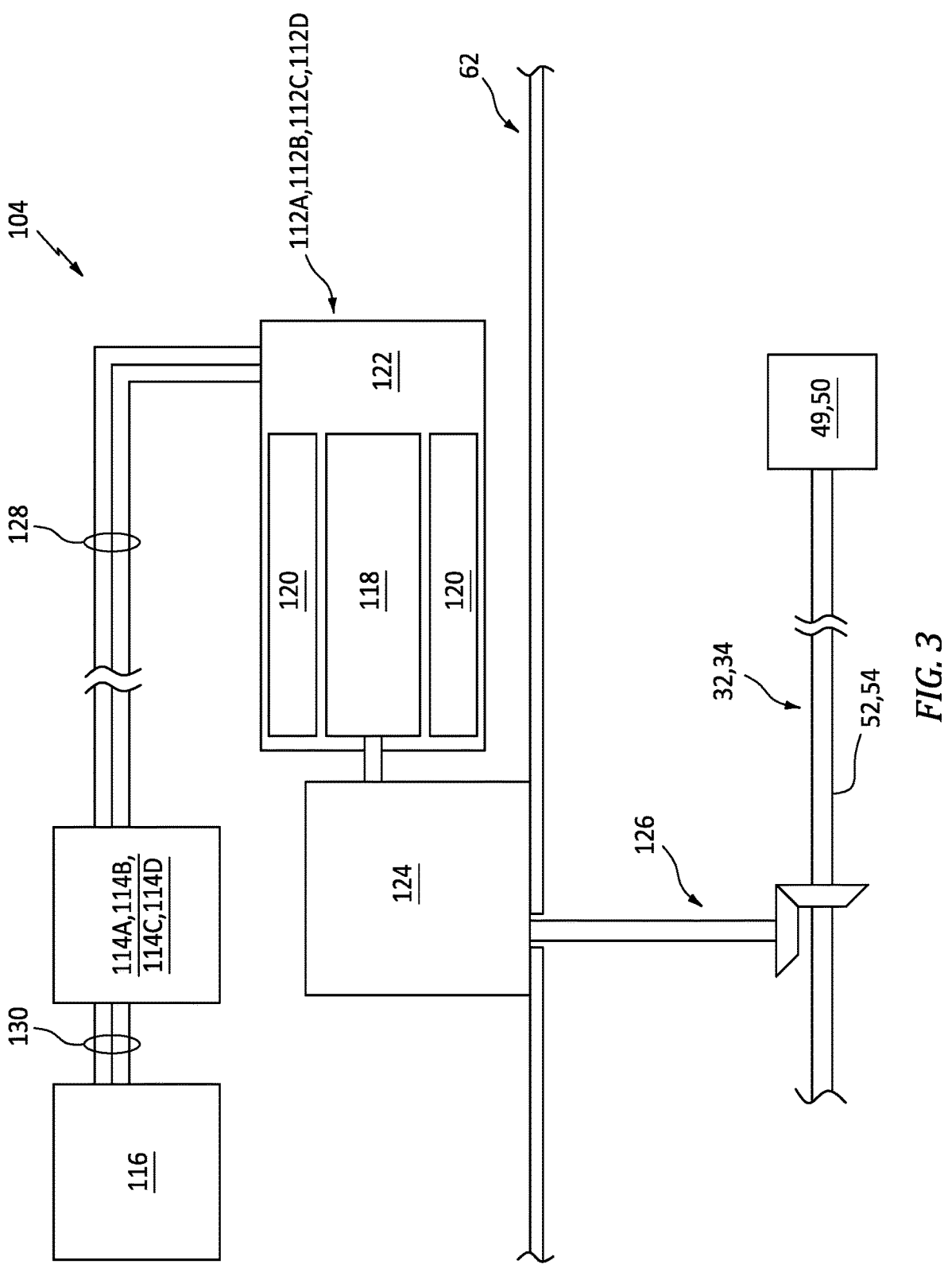
FIG. 3 is a partial side schematic illustration of a high power system arranged with an engine core.

The high power system 104 may be configured as or otherwise include one or more electric machines 112A-D (generally referred to as "112"), one or more electric machine control units 114A-D (generally referred to as "114") and a power bus 116; e.g., a direct current (DC) bus bar. Referring to FIG. 3, each electric machine 112 includes an electric machine rotor 118, an electric machine stator 120 and an electric machine housing 122. The machine rotor 118 is rotatable about a rotational axis of the machine rotor 118. The machine stator 120 of FIG. 3 is radially outboard of and circumscribes the machine rotor 118. With this arrangement, the electric machine 112 is configured as a radial flux electric machine. The electric machine 112 of the present disclosure, however, is not limited to such an exemplary rotor-stator configuration nor to radial flux arrangements. The machine rotor 118, for example, may alternatively be radially outboard of and circumscribe the machine stator 120. In another example, the machine rotor 118 may be axially next to the machine stator 120 configuring the electric machine 112 as an axial flux electric machine. Referring again to FIG. 3, the machine rotor 118 and the machine stator 120 are at least partially or completely housed within the machine housing 122.

The machine rotor 118 may be operatively coupled to a respective one of the core rotating assemblies 32, 34. The machine rotor 118 of each electric machine 112A, 112B, for example, may be coupled to the low speed rotating assembly 34. The machine rotor 118 of each electric machine 112C, 112D may be coupled to the high speed rotating assembly 32. The machine rotor 118 of FIG. 3, in particular, is coupled to the respective core rotating assembly 32, 34 (e.g., indirectly) through an accessory gearbox 124 for the turbine engine 22 and a tower shaft assembly 126. The present disclosure, however, is not limited to such an exemplary electric machine to rotating assembly coupling. For example, various other techniques are known in the art for coupling an accessory gearbox to a rotating assembly, and the present disclosure is not limited to any particular ones thereof. Moreover, it is contemplated the respective electric machine 112 may alternatively be directly coupled to the respective core rotating assembly 32, 34 in other embodiments. More particularly, while the respective electric machine 112 may be disposed outside of the core case 62 as shown in FIG. 3, it is contemplated the electric machine 112 may alternatively be arranged within the core case 62 in other embodiments.

The electric machine 112 of FIG. 3 may be configurable as an electric generator and/or an electric motor; e.g., a motor-generator. For example, during a generator mode of operation, the electric machine 112 may operate as the electric generator to convert mechanical power received from the respective core rotating assembly 32, 34 into electricity. The respective core rotating assembly 32, 34 and its turbine rotor 49, 50, for example, may drive rotation of the machine rotor 118 through the tower shaft assembly 126 and the accessory gearbox 124. The rotation of the machine rotor 118 may generate an electromagnetic field with the machine stator 120, and the machine stator 120 may convert energy from the electromagnetic field into the electricity. The electric machine 112 may then output this electricity through its respective control unit 114 and the power bus 116 for further use. During a motor mode of operation, the electric machine 112 may operate as the electric motor to convert electricity received through the power bus 116 and the respective control unit 114 into mechanical power. The machine stator 120, for example, may generate an electromagnetic field with the machine rotor 118 using the electricity. This electromagnetic field may drive rotation of the machine rotor 118. The machine rotor 118 may thereby drive rotation of the respective core rotating assembly 32, 34 through the accessory gearbox 124 and the tower shaft assembly 126. This mechanical power may be provided to the respective core rotating assembly 32, 34 to boost power or completely power rotation of the respective core rotating assembly 32, 34. Of course, in other embodiments, one or more or all of the electric machines 112 may alternatively be configured as a dedicated electric motor (e.g., without the electric generator functionality) or as a dedicated electric generator (e.g., without the electric motor functionality).

Each control unit 114 is electrically coupled to the respective electric machine 112 through a plurality of high power electrical lines 128. Each control unit 114 is configured to control operation of the respective electric machine 112. Each control unit 114, for example, may regulate the electricity input into the respective electric machine 112 during its motor mode of operation. Each control unit 114 may also operate as an inverter to convert direct current (DC) electricity received from the power bus 116 into alternating current (AC) electricity for provision to the respective electric machine 112. Each control unit 114 may also or alternatively regulate the electricity output from the respective electric machine 112 during its generator mode of operation. Each control unit 114 may also operate as a rectifier to convert AC electricity received from the respective electric machine 112 to DC electricity for provision to the power bus 116.

The power bus 116 is electrically coupled to each control unit 114 through a plurality of high power electrical lines 130. Referring to FIG. 2, the power bus 116 is configured to electrically couple each electric machine 112 and its control unit 114 to one or more other electrical components or systems of the aircraft. The power bus 116, for example, may electrically couple a respective electric machine 112 and its control unit 114 (or multiple electric machines 112 and their control units 114) to one or more other electric machines 112 and their control units 114 for power sharing; e.g., power extraction and power injection. In another example, the power bus 116 may electrical couple a respective electric machine 112 and its control unit 114 (or multiple electric machines 112 and their control units 114) to a power source; e.g., a battery or a battery bank, another engine (e.g., an auxiliary power unit (APU), an engine of a companion propulsion system, etc.), etc. In still another example, the power bus 116 may electrically couple a respective electric machine 112 and its control unit 114 (or multiple electric machines 112 and their control units 114) to one or more other electrical components or systems of the aircraft propulsion system 20, or more generally, one or more other electrical components or systems of the aircraft.

One or more or all of the elements 112, 114, 116, 128 and/or 130 of the high power system 104 may be configured for a peak or average high power system (HPS) operating power and a peak or average high power system (HPS) operating current. The HPS power may be equal to or greater than twenty kilowatts (20 kW); e.g., between twenty kilowatts (20 kW) and two thousand kilowatts (2000 kW). Each high power system (HPS) element 112, 114, 116, 128, 130 of FIG. 2, for example, may be configured for a HPS operating power of five hundred kilowatts (500 kW). The HPS current may be equal to or greater than one hundred amps (100 A); e.g., between one hundred amps (100 A) and fifteen hundred amps (1500 A). Each high power system (HPS) element 112, 114, 116, 128, 130 of FIG. 2, for example, may be configured for a HPS operating current of eight hundred amps (800 A).

The low power systems of FIG. 2 include an actuation system 106, an ignition system 108 and a control system 110. The actuation system 106 of FIG. 2 includes one or more electric actuators 132, an actuator controller 134 (or multiple controllers) and one or more electrical lines 136 electrically coupling the actuator controller 134 to each of the electric actuators 132. Examples of the electric actuators 132 include, but are not limited to, electric motors, electric solenoids, electromagnets, and the like. The actuator controller 134 is configured to control operation of the electric actuators 132 by, for example, regulating electricity provided to each electric actuator 132.

The ignition system 108 of FIG. 2 includes one or more electric ignitors 138, an electric exciter 140 and one or more electrical lines 142 electrically coupling the electric ignitors 138 to the electric exciter 140. The electric ignitors 138 are arranged within the combustor section 42 (see FIG. 1) and are configured to ignite the fuel-air mixture within the combustion chamber 100 (see FIG. 1). The electric exciter 140 is configured to control operation of the electric ignitors 138 by, for example, regulating electricity provided to each electric ignitor 138.

The control system 110 of FIG. 2 includes an onboard engine controller 144 and one or more electrical lines 146 electrically coupling the engine controller 144 to one or more other components of the electrical system 102 (e.g., sensors, actuators, motors, etc.) arranged within the turbine engine 22 (see FIG. 1). This engine controller 144 may also be configured to control one or more of the electrical system elements; e.g., the control units 114, the actuator controller 134, the electric exciter 140, etc. Examples of the engine controller 144 include, but are not limited to, an electronic engine controller (EEC), an electronic control unit (ECU), and a full-authority digital engine controller (FADEC).

One or more or all of the elements 132, 134, 136, 138, 140, 142, 144 and/or 146 of the low power systems 106, 108 and 110 may be configured for a peak or average low power system (LPS) operating power and a peak or average low power system (LPS) operating current. The LPS power may be equal to or less than twenty kilowatts (20 kW); e.g., equal to or less than twenty kilowatts (20 kW) to as low as 0.01 kilowatts. Each low power system (LPS) element 132, 134, 136, 138, 140, 142, 144, 146 of FIG. 2, for example, may be configured for a LPS operating power of one kilowatt (1 kW). The LPS current may be equal to or less than fifty amps (50 A); e.g., equal to or less than fifty amps (50 A), forty-five amps (45 A) or forty amps (40 A), to as low as 0.001 amps (0.001 A). Each low power system (LPS) element 132, 134, 136, 138, 140, 142, 144, 146 of FIG. 2, for example, may be configured for a LPS operating current of 0.01 amps (0.01 A).

The electrical system 102 of FIG. 2 is arranged with the turbine engine 22 as an inner electrical system 148 and an outer electrical system 150. The inner electrical system 148 includes various electrical components of the electrical system 102 such as, but not limited to, the electric machines 112, the electric actuators 132, the electric ignitors 138 and/or the other component(s) coupled to the engine controller 144. These electrical components are arranged at an inner region of the aircraft propulsion system 20 and, thus, may be referred to as inner electrical components. The inner electrical components, for example, may be arranged with the engine core 70 (see FIG. 1). One or more of the inner electrical components may be located within the inner compartment 72 (see FIG. 1), for example radially next to the core case 62 and mounted directly or indirectly to the core case 62. One or more of the inner electrical components may also or alternatively be located radially within the core case 62.

The outer electrical system 150 includes various electrical components of the electrical system 102 such as, but not limited to, the control units 114, the power bus 116, the actuator controller 134, the electric exciter 140 and the engine controller 144. These electrical components are arranged at an outer region of the aircraft propulsion system 20 and, thus, may be referred to as outer electrical components. The outer electrical components, for example, may be arranged with the fan case 64. Each outer electrical component, in particular, is disposed radially outboard of the fan case 64, for example radially next to the fan case 64 and mounted directly or indirectly to the fan case 64.

Figure 4:
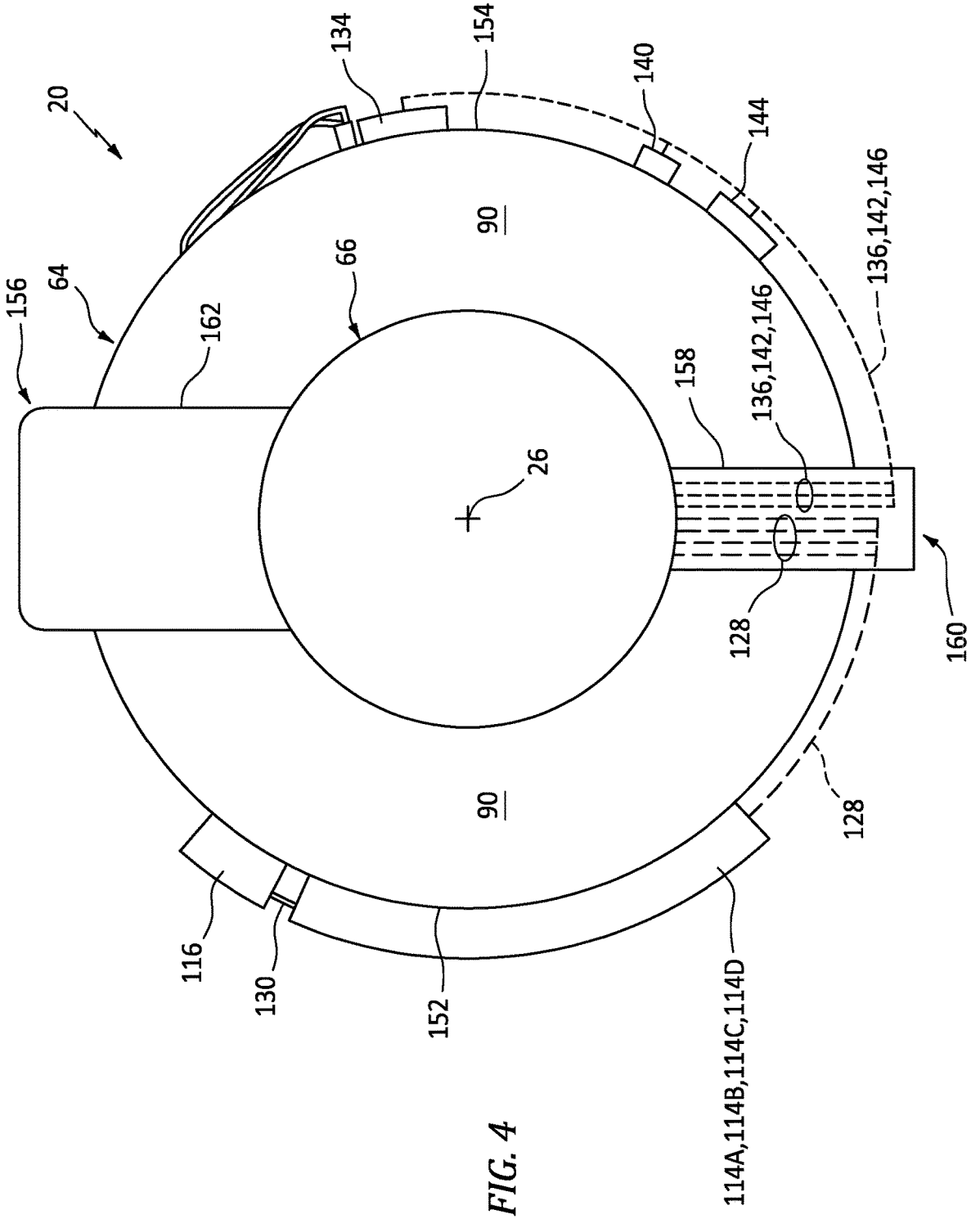
FIG. 4 is an end view schematic illustration of the aircraft propulsion system with its electrical system.

Referring to FIG. 4, the HPS components 114 and 116 are arranged to a first lateral side 152 of the fan case 64. The LPS components 134, 140 and 144 are arranged to a second lateral side 154 of the fan case 64 which is laterally (e.g., diametrically) opposite the first lateral side 152. With this arrangement, the LPS components 134, 140 and 144 may be spatially separated from the HPS components 114 and 116 so as to reduce possible electromagnetic interference (EMI) between the LPS components 134, 140 and 144 and the HPS components 114 and 116.

Figure 5:
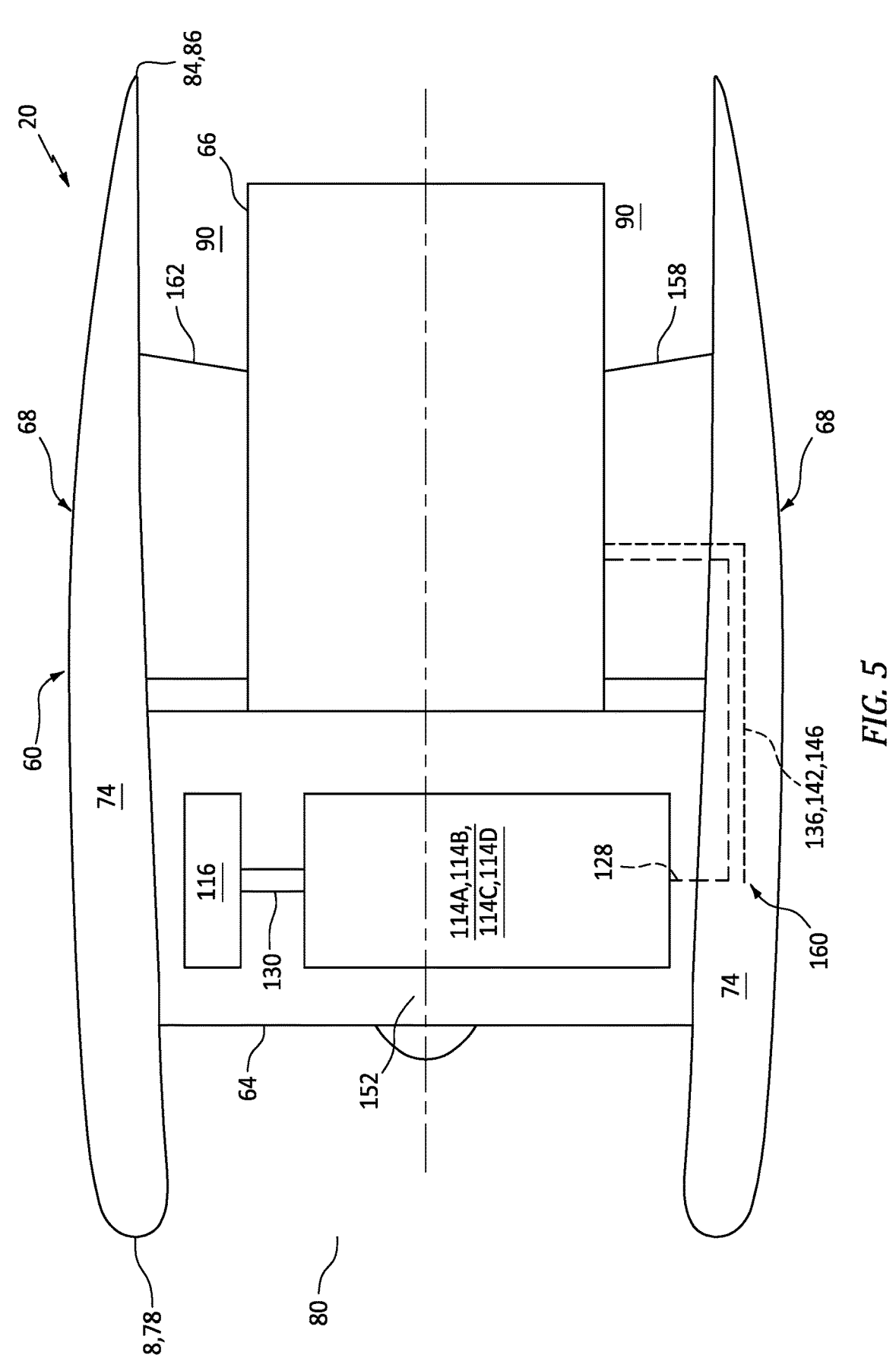
FIG. 5 is a side cutaway illustration of a portion of the aircraft propulsion system with its high power system schematically shown.

Referring to FIG. 5, the power bus 116 may be spaced from the control units 114 circumferentially about the fan case 64. The power bus 116 of FIG. 5, for example, is arranged vertically above the control units 114 along the fan case 64, for example with respect to gravity when the aircraft is on ground or in level flight. With this arrangement, a distance between the control units 114 and the electric machines 112 may be minimized. A distance between the power bus 116 and a connection 156 (see FIG. 4) to an airframe of the aircraft (e.g., a pylon structure) may also be minimized.

Referring to FIG. 2, the electrical lines 128, 136, 142 and/or 146 extend between and electrically couple the inner electrical system 148 to the outer electrical system 150. In particular, the electrical lines 128, 136, 142 and/or 146 electrically couple the inner electrical components (e.g., 112, 132 and/or 138) to the outer electrical components (e.g., 114, 134, 140 and/or 144) as described above. Some or all of these electrical lines 128, 136, 142 and/or 146 may be run (e.g., in parallel) along one another from the core case 62 to the fan case 64. The electrical lines 128, 136, 142 and/or 146 of FIG. 5, for example, run in parallel along one another radially through a lower bifurcation 158 from the inner compartment 72 (see FIG. 1) to the outer compartment 74 in the nacelle outer structure 68. The electrical lines 128, 136, 142 and/or 146 may then run in parallel along one another axially within the outer compartment 74 to the fan case 64 and partially along an axial aft section of the fan case 64 to a split location 160. At this split location 160, the HPS electrical lines 128 of FIGS. 2 and 4 turn away from the LPS electrical lines 136, 142 and 146 and extend in a first circumferential direction along the fan case 64 away from the split location 160 and the lower bifurcation 158 (see FIG. 5) to the respective HPS components 114 and 116. Also at the split location 160, the LPS electrical lines 136, 142 and 146 of FIGS. 2 and 4 turn away from the HPS electrical lines 128 and extend in a second circumferential direction along the fan case 64 away from the split location 160 and the lower bifurcation 158 (see FIG. 5) to the respective LPS components 134, 140 and 144. This second circumferential direction is opposite the first circumferential direction about the fan case 64 and the axis 26.

Referring to FIG. 5, the lower bifurcation 158 is disposed to a vertical bottom side (e.g., a vertical lower side) of the engine core 70 and its core case 62. This lower bifurcation 158 extends radially across the bypass flowpath 90 from the nacelle inner structure 66 to the nacelle outer structure 68. By running the electrical lines 128, 136, 142 and/or 146 through the lower bifurcation 158, an upper bifurcation 162 crossing the bypass flowpath 90 may be utilized for other aircraft propulsion system components such as, for example, a mounting structure as well as one or more heat exchangers.

Figure 6:
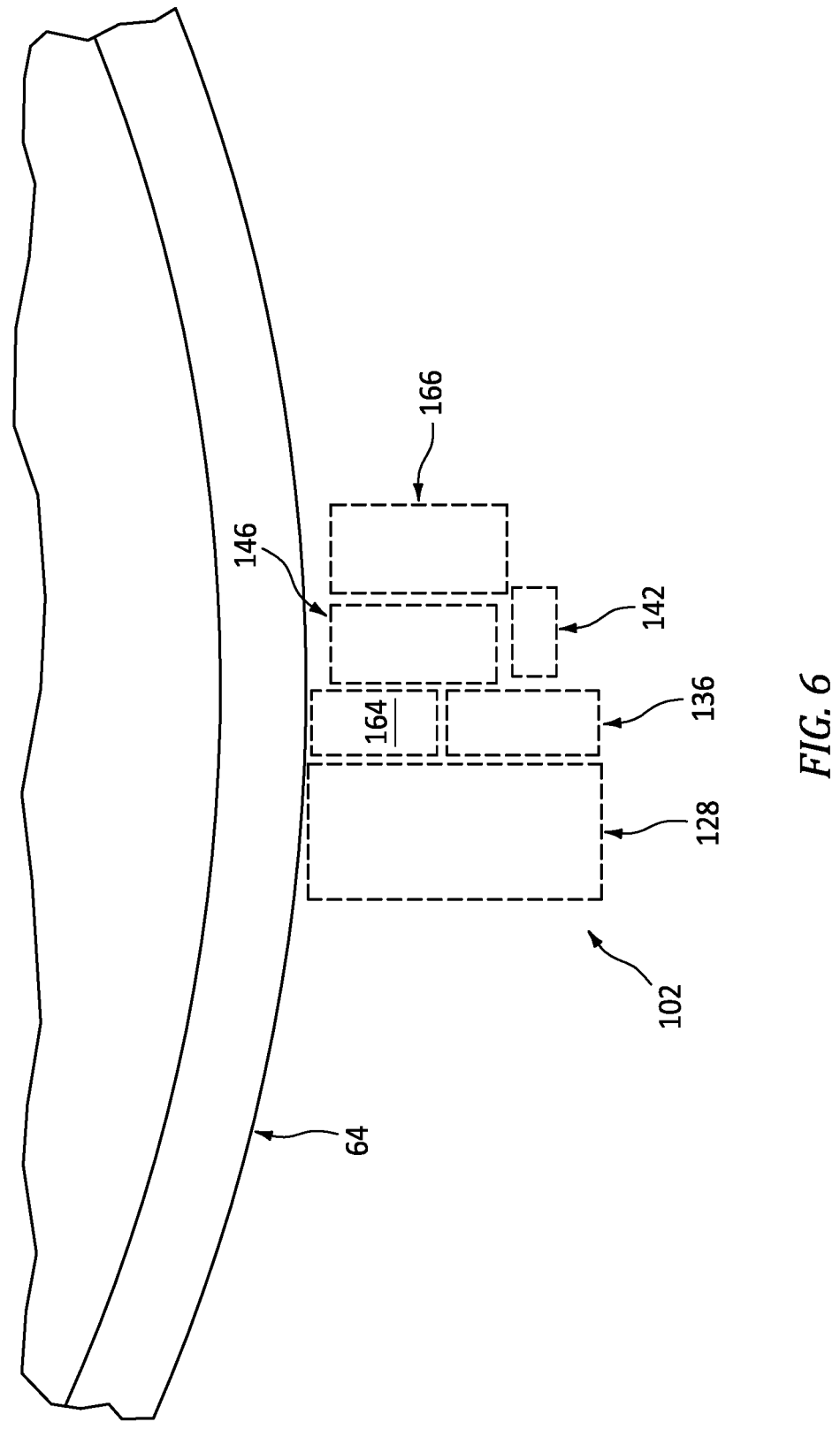
FIGS. 6 and 7 are illustrations of a grouping of lines in various arrangements.

Referring to FIG. 6, where the electrical lines 128, 136, 142 and/or 146 are run together, the HPS electrical lines 128 may be arranged to a first lateral side of the grouping and the LPS electrical lines 136, 142 and 146 may be arranged to a second lateral side of the grouping. In some embodiments, an air passage 164 (e.g., a duct) may also be run along the electrical lines 128, 136, 142 and/or 146. This air passage 164 may be disposed within the grouping laterally between the HPS electrical lines 128 and the LPS electrical lines 136, 142 and/or 146. One or more fluid lines 166 (e.g., coolant lines, fuel lines, lubricant lines, etc.) may also or alternatively be run along the electrical lines 128, 136, 142 and/or 146. The LPS electrical lines 136, 142 and/or 146 and the air passage 164 of FIG. 6 laterally separate the fluid lines 166 from the HPS electrical lines 128 to locate, for example, flammable fluids as far from the HPS electrical lines 128 as possible.

Figure 7:
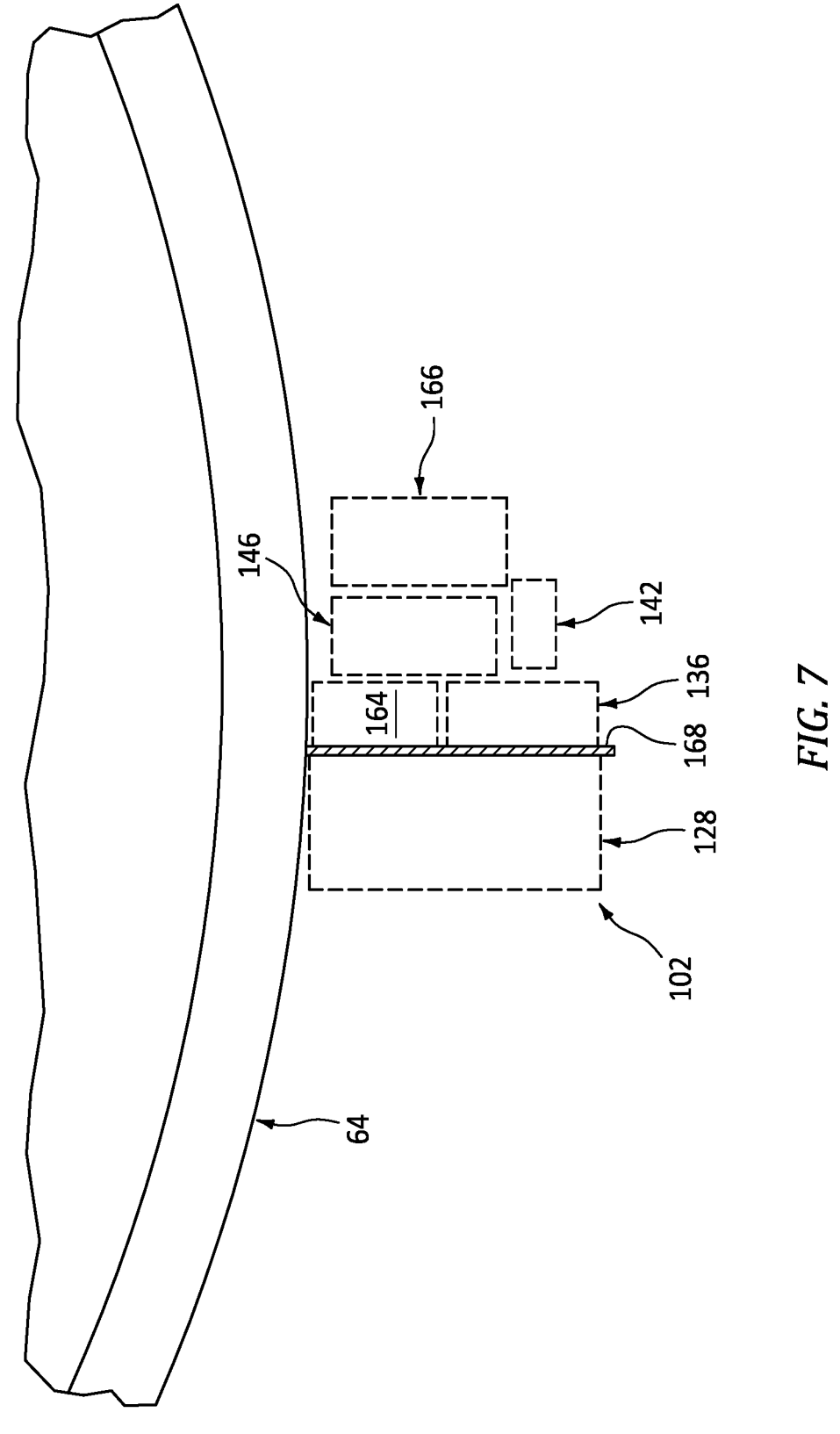

In some embodiments, referring to FIG. 7, the grouping of the lines 128, 136, 142, 146 and/or 166 may be arranged with a non-conductive barrier 168. This barrier 168 is disposed laterally between the HPS electrical lines 128 and the LPS electrical lines 136, 142 and 146 as well as the fluid lines 166. Additionally or alternatively, the non-conductive barrier 168 or another non-conductive barrier may be disposed laterally between the fluid lines 166 and the LPS electrical lines 136, 142 and 146 as well as the HPS electrical lines 128.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
   a fan rotor;
   an engine core configured to drive rotation of the fan rotor about an axis;
   a fan case housing the fan rotor;
   a core case housing the engine core;
   a bifurcation radially crossing a bypass flowpath, the bypass flowpath downstream of the fan rotor and located radially between the fan case and the core case;
   an inner electrical system arranged with the engine core;
   an outer electrical system mounted to the fan case;
   a plurality of electrical lines extending between and electrically coupling the inner electrical system to the outer electrical system, the plurality of electrical lines run in parallel along one another radially outward through the bifurcation, the plurality of electrical lines run in parallel, in an axially forward and upstream direction, from the bifurcation to a split location at the fan case, a first set of the plurality of electrical lines extending in a first direction circumferentially along the fan case away from the split location, each electrical line in the first set of the plurality of electrical lines configured for an operating power greater than twenty kilowatts and configured for an operating current greater than one hundred amps, a second set of the plurality of electrical lines extending in a second direction circumferentially along the fan case opposite the first direction and away from the split location, each electrical line in the second set of the plurality of electrical lines configured for an operating power less than twenty kilowatts and configured for an operating current less than fifty amps; and
   a non-conductive barrier separating the first set of the plurality of electrical lines from the second set of the plurality of electrical lines as the plurality of electrical lines run in parallel through the bifurcation and from the bifurcation to the split location.

2. The system of claim 1, wherein the operating power for the each electrical line in the first set of the plurality of electrical lines is greater than thirty kilowatts.

3. The system of claim 1, wherein the operating power for the each electrical line in the second set of the plurality of electrical lines is less than fifteen kilowatts.

4. The system of claim 1, wherein the plurality of electrical lines run in parallel axially along an aft section of the fan case.

5. The system of claim 1, wherein
   the inner electrical system comprises a first electric machine;
   the outer electrical system comprises a first control unit; and
   the first set of the plurality of electrical lines comprises a first electrical line extending between and electrically coupling the first electric machine and the first control unit.

6. The system of claim 5, wherein
   the engine core comprises a rotating assembly with a turbine rotor; and
   the first electric machine is operatively coupled to the rotating assembly.

7. The system of claim 5, wherein the first electric machine comprises an electric motor.

8. The system of claim 5, wherein the first electric machine comprises an electric generator.

9. The system of claim 5, wherein
   the inner electrical system further comprises a second electric machine;
   the outer electrical system further comprises a second control unit; and
   the first set of the plurality of electrical lines comprises a second electrical line extending between and electrically coupling the second electric machine and the second control unit.

10. The system of claim 9, wherein
    the engine core comprises a rotating assembly with a turbine rotor; and
    the first electric machine and the second electric machine are each operatively coupled to the rotating assembly.

11. The system of claim 9, wherein
    the engine core comprises a first rotating assembly and a second rotating assembly, the first rotating assembly comprises a first turbine rotor, and the second rotating assembly comprises a second turbine rotor; and
    the first electric machine is operatively coupled to the first rotating assembly; and
    the second electric machine is operatively coupled to the second rotating assembly.

12. The system of claim 1, wherein
    the second set of the plurality of electrical lines comprises a first electrical line;
    the inner electrical system comprises an electrical component electrically coupled to the first electrical line; and
    the electrical component comprises one of a sensor, an actuator or an ignitor.

13. The system of claim 1, wherein
    the second set of the plurality of electrical lines comprises a first electrical line;
    the outer electrical system comprises an electrical component electrically coupled to the first electrical line; and
    the electrical component comprises one of a controller or an exciter.

14. The system of claim 1, further comprising one or more fluid lines run in parallel along the plurality of electrical lines radially outward through the bifurcation and axially forward to the split location, with the second set of the plurality of electrical lines laterally between the first set of the plurality of electrical lines and the one or more fluid lines.

15. A system for an aircraft, comprising:

a fan rotor;

an engine core configured to drive rotation of the fan rotor about an axis;

a fan case housing the fan rotor;

a core case housing the engine core;

a bifurcation extending radially across a bypass flowpath, the bypass flowpath downstream of the fan rotor and radially between the core case and the fan case;

a first inner electrical component arranged with the engine core and having a first operating power greater than twenty kilowatts;

a second inner electrical component arranged with the engine core and having a second operating power less than twenty kilowatts;

a first outer electrical component mounted to the fan case;

a second outer electrical component mounted to the fan case;

a first line electrically coupling the first inner electrical component to the first outer electrical component; and a second line electrically coupling the second inner electrical component to the second outer electrical component; and a non-conductive barrier;

the first line and the second line run in parallel through the bifurcation and, in an upstream direction, to a split location at the fan case, the first line runs in a first circumferential direction along the fan case away from the split location to the first outer electrical component, and the second line runs in a second circumferential direction along the fan case opposite the first circumferential direction and away from the split location to the second outer electrical component, and the non-conductive barrier separating the first line from the second line as the first line and the second line run in parallel through the bifurcation and from the bifurcation to the split location, wherein the first line is configured for an operating current greater than one hundred amps, and the second line is configured for an operating current less than fifty amps.

16. A system for an aircraft, comprising:

a fan rotor;

an engine core configured to drive rotation of the fan rotor about an axis;

a fan case housing the fan rotor;

a core case housing the engine core;

a lower bifurcation radially crossing a bypass flowpath, the bypass flowpath downstream of the fan rotor and located radially between the fan case and the core case;

a plurality of electric machines operatively coupled to the engine core and radially next to the core case;

a plurality of control units mounted to the fan case at a first lateral side of the fan case;

an electrical bus mounted to the fan case vertically above the plurality of control units and at the first lateral side of the fan case, the electrical bus electrically coupled to each of the plurality of control units;

a plurality of electrical lines extending between and electrically coupling the plurality of electric machines to the plurality of control units, the plurality of electrical lines extending radially outward through the lower bifurcation and, in an axially forward and upstream direction, from the lower bifurcation to the fan case; and an engine controller mounted to the fan case at a second lateral side of the fan case opposite the first lateral side of the fan case, wherein each electrical line in a first set of the plurality of electrical lines is configured for an operating current greater than one hundred amps, and each electrical line in a second set of the plurality of electrical lines is configured for an operating current less than fifty amps.

* * * * *